Nov. 30, 1965   J. B. REISINGER   3,220,299
ILLUMINATED RETICULE FOR OPTICAL INSTRUMENTS
Filed July 14, 1960
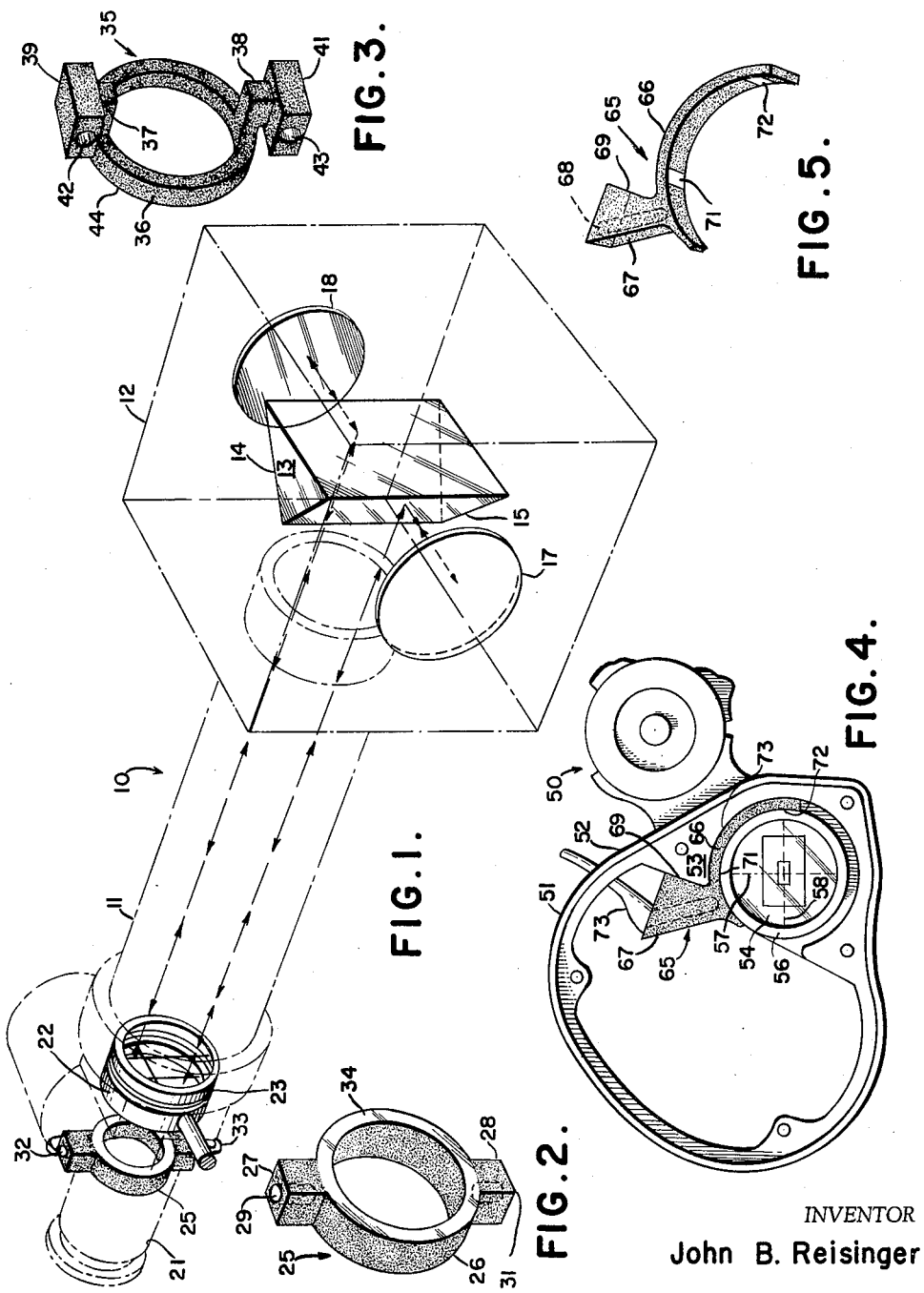
INVENTOR
John B. Reisinger
BY *Fidelman & Lavine*
ATTORNEY

United States Patent Office 3,220,299
Patented Nov. 30, 1965

3,220,299
ILLUMINATED RETICULE FOR OPTICAL
INSTRUMENTS
John B. Reisinger, Cocoa Beach, Fla.
(5535 Gross Court, Orlando, Fla.)
Filed July 14, 1960, Ser. No. 42,917
6 Claims. (Cl. 88—1)

The present application is a continuation-in-part of an application for "Optical Alignment Instrument" of John B. Reisinger, filed June 8, 1960, Serial No. 34,783.

This invention relates to illuminators for optical instruments, and more particularly to illuminators of light conducting material for the reticules of optical instruments.

With certain optical instruments of high accuracy, it is necessary to align the parts thereof before proceeding to use them. This has often necessitated the collimating of the instrument, which ordinarily must be accomplished in an optical shop. In any event, the collimation of an optical instrument to determine the alignment and accuracy of the parts thereof has heretofore required the utilization of auxiliary equipment, which at best, was difficult to carry into the field and use.

In another area of the use of optical instruments, it is often desirable to provide illumination for the reticle of the instrument, so that the reticle will stand out sharply in contrast with the target being observed. This is necessary in order to properly align the instrument with the target. One specific area in which reticle illumination is highly desirable is in conjunction with binoculars which are used to follow the flight paths of air-borne vehicles, in particular where the motion of the binoculars is used to direct a camera which photographs the flight of the air-borne vehicle. Heretofore, because of the absence of illumination on the reticule, the observer has not been able to properly center the binoculars on the air-borne vehicle during its travel, and consequently the following cameras have, in many cases, completely missed photographing the vehicle. For this reason, such night photography had been abandoned.

In the general field of the illumination of reticles of optical instruments, there have heretofore been proposed various structures for accomplishing this illumination, but these structures have often been quite complex, have required many parts and in general have been both expensive and unduly complicated.

An object of the present invention is to provide an illuminator for an optical instrument which will permit auto-collimation of the instrument.

Another object of the present invention is the provision of an illuminator for the reticule of an optical instrument which is economical, readily installed and relatively simple.

Yet another object of the present invention is to provide an illuminator that will give proper and adequate illumination to the reticule of a telescopic instrument.

A further object of the present invention is the provision of an illuminator which may be incorporated into standard binoculars, and without increasing the weight of the binoculars to any substantial degree, and without changing the handling characteristics of the binoculars.

Other objects and the nature and advantages of the instant invention will be apparent from the following description taken in conjunction with the accompanying drawings, wherein:

FIG. 1 is a phantom perspective view of an optical instrument having an illuminator incorporated therein.

FIG. 2 is a perspective view of the illuminator of FIG. 1.

FIG. 3 is a perspective view of another embodiment of an illuminator for the instrument of FIG. 1.

FIG. 4 is a partial view of a pair of binoculars, taken from the eye-piece end, and with the eye-piece and attached cover plate removed, the binocular incorporating an illuminator in accordance with the present invention.

FIG. 5 is a perspective view of the illuminator shown in the binoculars of FIG. 4.

Referring now to the drawings, wherein like reference numerals are used to designate like or corresponding parts throughout the several views, there is shown in FIG. 1 an optical instrument generally designated 10, comprising a telescope 11 and a housing 12 at the front end of the telescope 11. Within the housing 12 is a prism 13 having a pair of reflecting surfaces 14 and 15, these surfaces each forming an angle of 135° with the optical axis of the telescope 11. In the sides of the housing 12 are a pair of windows 17 and 18, and as will be apparent images positioned laterally of the telescope 11 may be viewed through the windows 17 and 18, the images being reflected by the surfaces 14 and 15 into the telescope 11.

At the rear end of the telescope 11 is an eye-piece 21, in front of the eye-piece there being positioned a reticule ring 22 that supports a pair of cross-hairs therein. In advance of the reticule ring 22 is a second ring 23 having a single vertical indicating hair therein. The ring 22 may be adjusted relative to the optical axis of telescope 11 in order to position the cross-hairs in the reticule ring 22 on the optical axis of telescope 11 or to determine, as by a micrometer attachment, the distance of an image from the optical axis of the telescope 11.

To provide illumination for the reticule supported by the reticule ring 22 there is provided an illuminator generally designated 25, and as may be seen best in FIG. 2 the illuminator 25 comprises an integral piece of light conducting material, such as a suitable plastic, and has the form of an annular ring 26 having a pair of oppositely disposed extensions 27, 28. These extensions have bores 29 and 31 therein, the bores extending radially of the ring 26. The bores 29 and 31 are of suitable size to have placed therein sub-miniature light bulbs, from which leads 32 and 33 may be seen to extend in FIG. 1. All surfaces are polished, and then all exterior surfaces are coated with a light impervious coating except for annular forward face 34.

In FIG. 3 there may be seen an alternate embodiment of the illuminator which is to be used in conjunction with the instrument 10. The illuminator 35 comprises an annular ring 36 having generally rearwardly extending portions 37 and 38 on which are positioned the integral extensions 39 and 41, these latter extending generally transversely with respect to the axis of the annular ring 36. Transversely extending bores 42 and 43 and the extensions 39 and 41 receive sub-miniature light bulbs. Relative to the exterior surfaces, the forward face 44 of the illuminator 35 is uncoated, whereas the remainder of this illuminator is coated with a light impervious coating.

In order to collimate the instrument 10, the reticule carried by the reticule ring 22 will be illuminated from the illuminator 25, and the image thereof will pass forwardly, as is indicated by the dashed and arrowed lines, to the reflecting surfaces 14 and 15 of the prism 13, and thence will pass outwardly through the windows 17 and 18. If suitable reflecting surfaces are placed on the outer sides of the windows 17 and 18, the images will be reflected back to the reflecting surfaces 14 and 15, and thence along the telescope 11 to the eye-piece 21, passing through the reticule ring 22 and the second ring 23, as well as through the opening in the illuminator 25. If the instrument is properly collimated, the images passing forwardly and back through the optical system will coincide, and the viewer at the eye-piece 21 will see only a single image. By the amount by which the images do not coincide, the degree of maladjustment of the instrument may be observed, and the instrument either adjusted or further use thereof may be held in abeyance until adjustment is made.

With regard to the illuminators 25 and 35, light rays emanating from light bulbs placed in the bores of the extensions will be reflected internally of these illuminators, by virtue of the angularity of the parts thereof and by virtue of the light impervious coating, so that escape of the light rays may take place only through the forward faces 34 and 44, to thereby give a forwardly directed, diffusing, and generally annular light pattern from these illuminators. There is thereby effected a substantially complete illumination of the reticule in reticule ring 22, and thus this reticule is illuminated for the auto-collimating purpose above mentioned. As will be understood in other instrumentalities of less complexity such as ordinary telescopes, even and adequate illumination may be provided by the illuminators 25, 35, for ordinary purposes of observation, etc.

Referring now to FIG. 4, there may be seen an optical instrument 50 of the binocular type, only one section 51 being shown, the other section having been broken away. The section 51 has a casing 52 including a framework with a nose portion 53, a lens 54 adjacent the eye-piece being shown. As will be understood, the eye-piece structure and cover plate of the binocular section 51 have been removed, not being shown in FIG. 4 for purposes of clarity. The lens 54, which is one lens of the eye-piece, is mounted in a carrier ring 56, and in advance of the lens 54, i.e., away from the eye-piece, is a reticule comprising the cross-hairs 57, 58. As will be understood, the cross-hairs 57 and 58 may either be indentations on the surface of a transparent disc, or may be actual hair-like linearly extending members supported in a suitable ring.

The illuminator 65 shown in FIG. 4 has, as may also be seen in FIG. 5, an arcuate light conducting member 66 that has an extent of more than 90°, and which subtends an end of each of the cross-hairs or indicias 57, 58. The illuminator 65 also has an extension 67 on the arcuate member 66, extension 67 having a bore 68 therein for receiving a sub-miniature light bulb. The illuminator 65 has on it a light impervious coating, the coating being broken, or not applied, at the window areas 71, 72 which are on the interior surface of the arcuate member 66. These window areas 71 and 72 are substantially centered on the indicia or cross-hairs 57, 58.

A sub-miniature light bulb (not shown) is placed in the bore 68, and the leads thereof encased in a suitable sheath 73 which may be led through the casing 52 to a suitable source of energy.

As may be seen in FIG. 4, the inwardly directed nose portion 53 of the casing 52 is spaced from the reticule, and one side 73 of nose portion 53 is substantially concentric with the instrument optical axis, which will be understood to be only a point in the showing of FIG. 4, in particular that point where the cross-hairs 57 and 58 intersect. The arcuate member 66 has a portion thereof lying between the reticule and the side 73 of the nose portion, and in fact this portion of arcuate member 66 engages both the reticule and the side portion 73 so as to be held therebetween. In addition, the extension 67 of the illuminator 65 has the side 69 thereof conform to the nose 73, so as to provide further bearing and support for the illuminator 65 in the section 51 of binoculars 50.

The illuminator 65 may be installed in the section 51 of the prismatic binoculars 50, with engagement of the parts thereof with and between the parts of the binocular, as above set forth. A sub-miniature light bulb in the bore 68, and suitably supplied with current, will emanate rays which will travel within the illuminator 65, and will pass therefrom through the window areas 71 and 72, the rays being in the form of beams that travel along and serve to illuminate the indicia 57, 58. The illuminator is cemented to the reticule, or to the reticule retainer; in the latter case, apppropriate openings are made in the retainer to permit light from window areas 71 and 72 to pass through.

As will be understood, the illuminator 65 is easily fabricated, easily installed and provides adequate illumination for both of the indicia 57 and 58 of the binocular 50.

The illuminators and instruments of the present invention are easily handled, are of low cost, and provide for effective illumination of the reticules. Further, with the instrument of FIG. 1, auto-collimation of an optical instrument is readily achieved.

It will be obvious to those skilled in the art that various changes may be made without departing from the spirit of the invention and therefore the invention is not limited to what is shown in the drawings and described in the specification but only as indicated in the appended claims.

What is claimed is:

1. In combination, a prismatic optical instrument having a reticule, said reticule comprising a pair of mutually perpendicular linearly extending indicia lying generally perpendicular to the instrument optical axis and intersecting approximately on said optical axis, an illuminator for said indicia comprising an arcuate light conducting member having an extent of more than ninety degrees and subtending an end of each said indicia, an extension on said member having a bore therein for receiving a sub-miniature light bulb, a light impervious coating over said illuminator having a pair of window areas therein on the interior surface of said member, said window areas each being substantially centered on one of said indicia and of relatively small arc compared to the arcuate extent of said illuminator, whereby light from a bulb in said bore will be emitted from said window areas and will pass along each of said indicia to illuminate the same.

2. The combination of claim 1 wherein said instrument has a casing with an inwardly directed nose portion spaced from said reticule, said nose portion having a side thereof substantially concentric with the instrument optical axis, said arcuate member at least in part lying between said reticule and said side of said nose portion.

3. The combination of claim 2, said arcuate member engaging said side and said reticule.

4. The combination of claim 2 wherein said extension and arcuate member conform to and engage said nose portion and the interior of said arcuate member engages said reticule.

5. In combination, an optical instrument having a reticule comprising a pair of centered intersecting indicia, and an illuminator for said indicia comprising an arcuate light conducting member subtending an end of each indicia, said illuminator comprising bore means for receiving a source of light, and a light impervious coating over said illuminator having a pair of window areas therein on the interior surface of said member, said window areas each being substantially centered on said indicia and of relatively small arc compared to the arcuate extent of said illuminator.

6. An illuminator for the cross-hairs of an optical instrument comprising an arcuate light conducting member, an integral extension extending generally radially outwardly of said member, said extension having a bore therein adapted to receive a sub-miniature light bulb, a light impervious coating over said illuminator having a pair of window areas therein on the interior surface of said member and of relatively small arc compared to the arcuate extent of said illuminator, said windows being adapted to be substantially centered on the cross-hairs of an optical instrument.

References Cited by the Examiner

UNITED STATES PATENTS

| | | | |
|---|---|---|---|
| 1,529,643 | 3/1925 | Fenderl | 88—1 |
| 1,736,682 | 11/1929 | Tuckerman. | |
| 2,221,152 | 11/1940 | Rylsky | 88—1 |
| 2,259,910 | 10/1941 | Rylsky | 88—1 |
| 2,358,867 | 9/1944 | Madan | 240—6.4 |
| 2,577,807 | 12/1951 | Pryor | 88—2.2 |
| 2,588,974 | 3/1952 | Fontaine | 88—14 |
| 2,761,056 | 8/1956 | Lazo | 240—2.1 |
| 2,775,158 | 12/1956 | Mitchell | 88—14 X |
| 3,005,376 | 10/1961 | Evans. | |

FOREIGN PATENTS 105,371    4/1917    Great Britain.

JEWELL H. PEDERSEN, *Primary Examiner.*

WILLIAM MISIEK, *Examiner.*